United States Patent [19]

Ackley

[11] Patent Number: 5,659,431

[45] Date of Patent: *Aug. 19, 1997

[54] FIXED MOUNT IMAGER USING OPTICAL MODULE FOR READING ONE OR TWO-DIMENSIONAL SYMBOLOGY DATA

[75] Inventor: H. Sprague Ackley, Seattle, Wash.

[73] Assignee: Intermec Corporation, Everett, Wash.

[*] Notice: The term of this patent shall not extend beyond the expiration date of Pat. No. 5,536,924.

[21] Appl. No.: 546,778

[22] Filed: Oct. 23, 1995

[51] Int. Cl.⁶ .............. G02B 27/02; G06K 7/00; G06K 7/10
[52] U.S. Cl. .............. 359/798; 235/439; 235/454
[58] Field of Search .............. 359/798, 799, 359/800, 801; 235/462, 467, 472, 439, 454; 250/569

[56] References Cited

U.S. PATENT DOCUMENTS

| | | | |
|---|---|---|---|
| 3,169,186 | 2/1965 | Howard | 250/71 |
| 3,671,720 | 6/1972 | White et al. | 235/61.11 |
| 3,780,265 | 12/1973 | Lind | 235/439 |
| 3,919,528 | 11/1975 | Cooper et al. | 235/439 |
| 3,936,662 | 2/1976 | Rausing | 235/439 |
| 3,990,044 | 11/1976 | Fahey et al. | 340/146.3 |
| 4,029,945 | 6/1977 | Yamada et al. | 235/439 |
| 5,414,250 | 5/1995 | Swartz | 235/462 |
| 5,477,042 | 12/1995 | Wang | 235/462 |
| 5,536,924 | 7/1996 | Ackley | 235/454 |

FOREIGN PATENT DOCUMENTS

| | | | |
|---|---|---|---|
| 2683062 | 4/1993 | France | 235/439 |
| 2-212993 | 8/1990 | Japan | 235/439 |

*Primary Examiner*—Georgia Y. Epps
*Assistant Examiner*—Ricky Mack
*Attorney, Agent, or Firm*—Graham & James LLP

[57] ABSTRACT

A device is provided for reading information from a media containing randomly located encoded data in the form of a one or two-dimensional symbology is provided. The device comprises a housing having a slot capable of receiving the media therein to an axial extent thereof. The media is illuminated by a light source disposed within the housing. The light reflected from the media is received and converted into pixel data that includes data representative of the symbology. Thereafter, the symbology data is discriminated from among the pixel data, and the discriminated symbology data is converted into readable information signals. Alternatively, the device may comprise a housing having a window and a light source disposed within the housing capable of providing illumination through the window onto the media when positioned in proximity to the window. The light reflected from the media is transmitted through the window into the housing, where it is converted into pixel data that includes data representative of the two-dimensional symbology. The window may be disposed on a side of the housing facing horizontally, or may be disposed on an upper or lower surface facing vertically, or may be disposed at any other angle to facilitate reading of the symbology.

23 Claims, 3 Drawing Sheets

FIXED MOUNT IMAGER USING OPTICAL MODULE FOR READING ONE OR TWO-DIMENSIONAL SYMBOLOGY DATA

BACKGROUND OF THE INVENTION

1. Field of the Invention

The present invention relates to electro-optical imagers for reading a one or two-dimensional symbology, and more particularly, to a fixed position, orientation independent imager utilizing an optical module.

2. Description of Related Art

Optical imaging systems are commonly used to decipher data symbols printed on objects in order to identify the objects. A conventional bar code symbol represents a one-dimensional form of symbology, and comprises a pattern of vertical bars of various widths separated by spaces of various widths. Since the bar and space elements have different light reflecting characteristics, a reader can convert the symbology into an electrical signal by analyzing the light reflected from the symbol. The electrical signal can then be decoded to provide an alphanumeric representation of the symbol which identifies the object. Bar code symbols of this nature are now in common usage in various types of applications, such as inventory control, point of sale identification, or logistical tracking systems.

The bar code reader typically uses a light source that is scanned across the bar code field. Since the bar code symbology is often disposed on the object to be identified, it is desirable for the reader to be included in a hand held or portable device so that the reader can be brought to the object. Light emitting diodes (LEDs) are often utilized to provide the light source due to their light weight and low power requirements. The operator can physically move the LED across the bar code field, such as by use of a light pen. Alternatively, a bar code reader may include movable mirrors that automatically articulate light from a laser or laser diode back and forth at a high rate to scan across the bar code field. The reader may also generate a feedback signal, such as an audible tone, that alerts the operator as to the successful completion of a bar code reading operation.

Since the conventional one-dimensional symbology requires a relatively large amount of space to convey a correspondingly small amount of data, so-called two-dimensional symbologies have been developed. A two-dimensional symbology may comprise a matrix that occupies a uniform amount of space having a generally rectangular or square shape. Instead of bars and spaces, round or square dots disposed at particular rows and columns of the matrix correspond to the characters being conveyed. As a result, a matrix symbology can compress significantly more data into a given volume of space than a conventional one-dimensional bar code. Examples of commercially available two-dimensional symbologies include Code One, Data Matrix, and PDF417.

Portable two-dimensional symbology imagers convert the two-dimensional symbology data into pixel information that is deciphered into the alphanumeric information represented by the symbology data. These two-dimensional imagers can also be utilized to read one-dimensional symbology data, such as conventional bar code. Two-dimensional imagers may utilize charge-coupled device (CCD) technology to convert optical information from the symbology data into an electrical signal, but still require a light source to illuminate the symbology to enable detection by the CCD device. Moreover, to successfully image the symbology, the imager must be capable of determining the rotational orientation of the symbology. A reference symbol disposed adjacent to the symbology data, such as an L or T-shaped character, or other information contained within the symbology, can provide rotational orientation information.

While portable two-dimensional symbology readers are desirable for many applications by giving the operator substantial freedom of movement, they also have several drawbacks, chiefly being their limited power source. Since batteries often represent the heaviest single element of a portable reader, to minimize the reader's total weight manufacturers must invariably make certain trade-offs between battery capacity and device capability. For example, the illuminating capability of the light source may be limited in a manner that restricts the effective range of the device's imaging capability. Also, the processing ability of the device may be intentionally restricted to provide a certain minimum level of capability, which may render the device less sensitive under certain operating conditions.

Conventional fixed mount one-dimensional symbology imagers have been adapted to read two-dimensional symbologies, but these imagers also have significant drawbacks. These fixed mount imagers often utilize an articulated laser that sequentially scans the rows of the matrix symbology; however, such devices are unreliable due to the high number of moving parts. Moreover the devices are entirely orientation dependant, as the operator must align the two-dimensional symbology appropriately with the imager. Similarly, one-dimensional CCD imagers have also been provided that utilize a single one-dimensional row of CCD elements. To scan a two-dimensional matrix symbology, the row of CCD elements must be sequentially moved among the rows of the two-dimensional symbology. As with the articulated laser imagers, one-dimensional CCD imagers are orientation dependent and must be aligned with the symbology to accurately collect the information.

Accordingly, a critical need exists for a low cost, low complexity imager for both one and two-dimensional symbology that permits the communication of a relatively large amount of information while avoiding the drawbacks of conventional portable readers.

SUMMARY OF THE INVENTION

In accordance with the teachings of this invention, an imager for both one and two-dimensional symbology is provided within a fixed position structure. The imager adapts an optical module from a conventional two-dimensional imager, the optical module comprising a two-dimensional charged coupled device (CCD) and an associated focusing structure. By using a fixed position structure, a dependable power source can be supplied to the imager, providing the device with increased range and sensitivity.

In an embodiment of the invention, a device for reading information from a media containing encoded data in the form of a one or two-dimensional symbology is provided. The device comprises a housing having a slot capable Of receiving the media therein to an axial extent thereof. The symbology may be disposed on the media in any rotational orientation relative to the reading device. The media is illuminated by a light source disposed within the housing. The light reflected from the media is received and converted into pixel data that includes data representative of the one or two-dimensional symbology. Thereafter, the symbology data is discriminated from among the pixel data, and the discriminated symbology data is converted into readable information signals.

Alternatively, the device may comprise a housing having a window and a light source disposed Within the housing capable of providing illumination through the window onto the media when positioned in proximity to the window. The light reflected from the media is transmitted through the window into the housing, where it is converted into pixel data that includes data representative of the two-dimensional symbology. The window may be disposed on a side of the housing facing horizontally, or may be disposed on an upper or lower surface facing vertically. Further, a plurality of windows may be disposed on the housing which face in respectively differing directions.

A more complete understanding of the fixed mount imager using optical module will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

Figure 1:
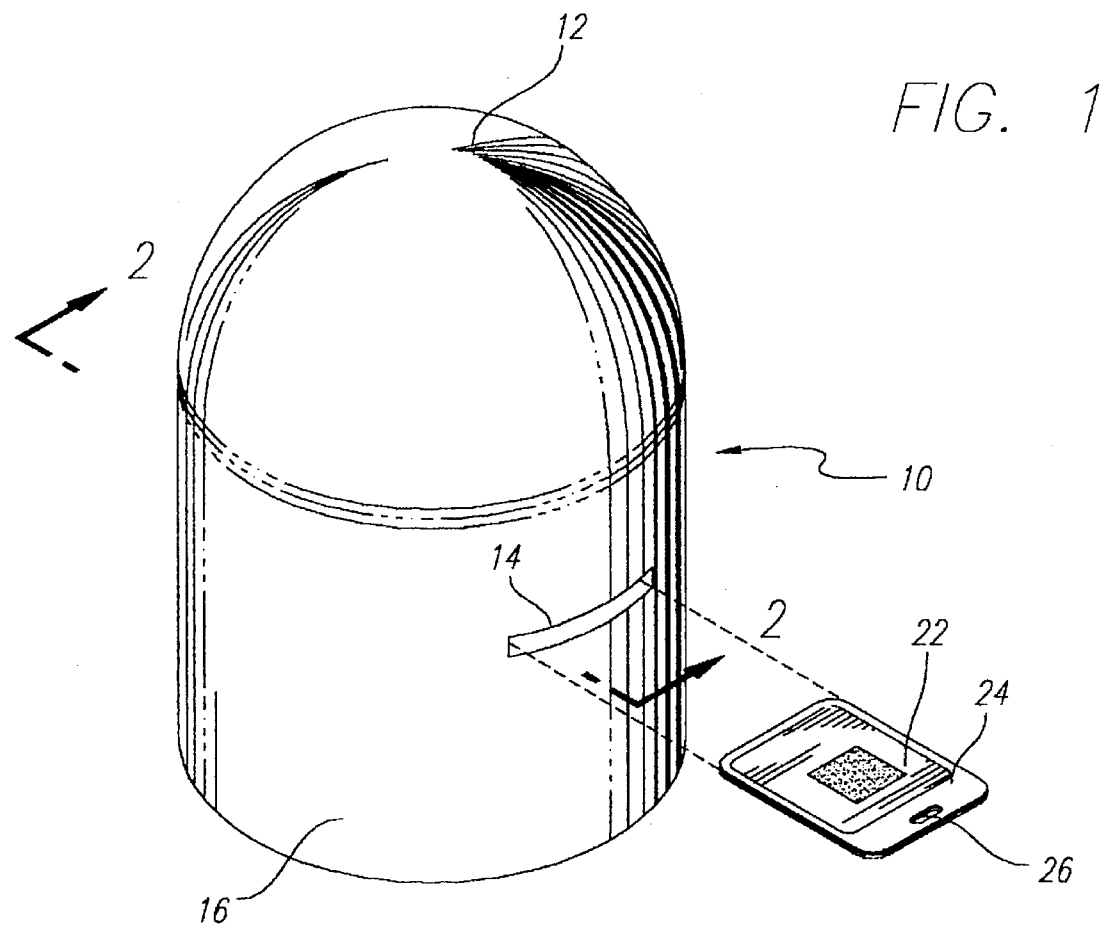
FIG. 1 is a perspective view of a one or two-dimensional symbology imager of an embodiment of the present invention.

This invention provides a low cost, low complexity one or two-dimensional symbology imager that permits the communication of a relatively large amount of information while avoiding the complexity and drawbacks of conventional readers. In the detailed description that follows, like reference numerals are used to describe like elements in one or more of the figures.

Referring first to FIG. 1, a one or two-dimensional symbology imager 10 is illustrated. The imager 10 is illustrated as having a dome shaped housing 12 with a cylindrically shaped base portion 16, although alternative shapes are equally feasible, such as rectangular. The dome 12 and base 16 may be a unitary construction, or may be separately constructed elements that are coupled together. The base portion 16 is intended to be fixedly attached to an external structure, such as a table, post, or wall. It is anticipated that the dome 12 and base 16 be constructed of light weight, high strength materials, such as high impact plastic or aluminum.

The imager 10 is intended for use with a card 24. The card 24 has a one or two-dimensional symbology 22 disposed on a surface portion thereof. As will be apparent from the description which follows, the precise location and orientation of the one or two-dimensional symbology 22 on the card is not critical. In fact, it is anticipated that the symbology location and orientation vary in an unpredictable or even random manner between different cards, because the imager 10 is capable of recognizing the symbology no matter where it is placed on the card. The card may further include a blank portion for use in disposing other graphic or textual information, such as photographs or other types of data symbols. An end of the card 24 opposite to the symbology 22 may include a hole 26 for attachment of connecting rings, clips or other devices for attaching the card to objects or persons. It is anticipated that the card 24 comprise a personal identification card, license, badge, medical record, manufacturing traveler, and the like.

The imager 10 further comprises a slot 14 for receiving the card 24. The slot 14 is dimensioned commensurate with the card 24, having a width and height corresponding to the width and height of the card. In the embodiment of FIG. 1, the slot has a relatively narrow height, such as approximately ¼ inch, and a width of approximately two (2) inches. The operator inserts the card 24 fully into the slot 14 so that the two-dimensional symbology 22 can be read by the imager 10.

Figure 2:
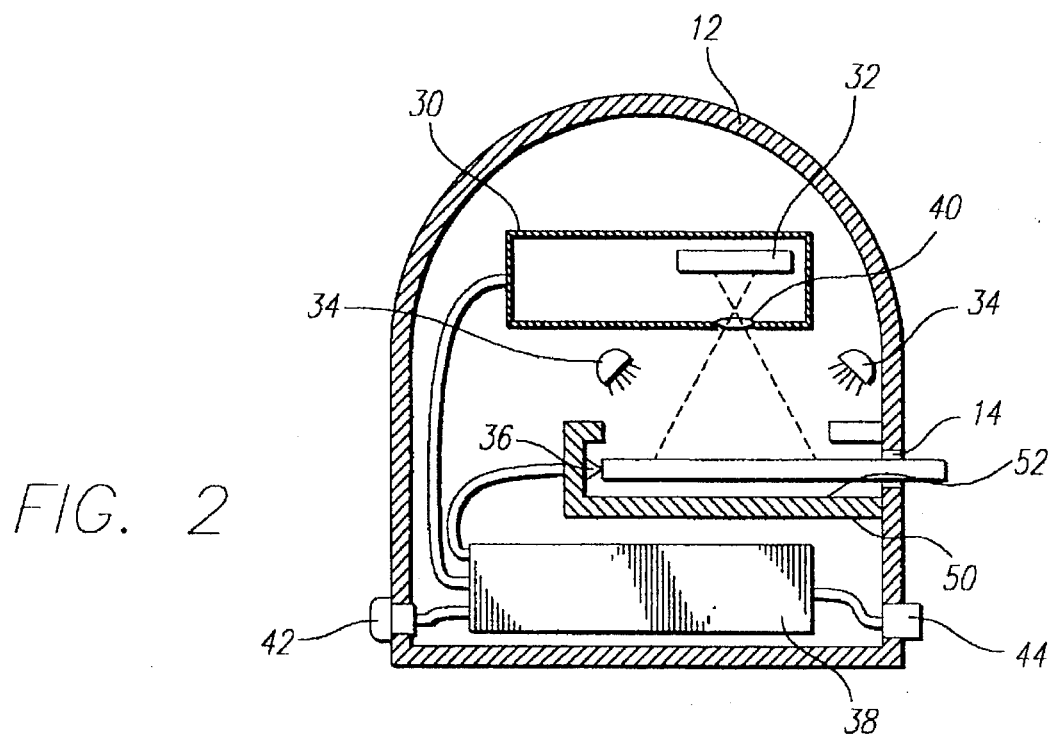
FIG. 2 is a sectional side view of the one or two-dimensional symbology imager, as taken through section 2—2 of FIG. 1.

Referring now to FIG. 2, the internal aspects of the imager 10 are illustrated. An optical module 30 is disposed within an upper internal region of the dome 12. In the preferred embodiment of the present invention, the optical module 30 is of a type originally intended for use in a portable two-dimensional symbology imager and is adapted for use in the present fixed imager 10. The optical module 30 comprises a light sensor 32, such as a charge coupled device (CCD) or other high speed, high density data storage medium capable of directly converting optical information into pixel data. The sensor 32 is substantially shielded from ambient sources of illumination by a housing of the optical module 30, with light being transmitted to the sensor through a lens 40. The lens 40 is disposed tangentially with respect to the plane of the sensor 32 so that light information can be transmitted through the lens onto the surface of the sensor. Alternatively, the lens 40 may be omitted, leaving a small diameter aperture, known as a "pin hole" aperture. It is anticipated that such an optical module could be manufactured inexpensively and in high production volumes.

The slot 14 is coupled to a channel 50 that receives the card 24. The channel 50 is disposed opposite from the optical module 30 and parallel to the plane of the sensor 32. The channel 50 has a lower surface 52 that provides a guide for insertion of the card 24 into the imager 10. The channel 50 is open at an upper surface to expose the entire surface of the card 24 to the sensor 32 via the lens 40. A position sensor 36 is disposed at a rear end of the channel 50 to detect the presence of the card 24 at the maximum axial extent of the channel, and produces a corresponding electrical signal. A light source 34 is disposed within the dome portion 12 such that light is directly illuminated through the open upper surface of the channel 50 onto the card 24 and the two-dimensional symbology 22. The light source 34 may comprise light emitting diodes (LED) or conventional light bulbs. Preferably, the light source 34 would be disposed very close to the surface of the card 24 so that maximum light energy is illuminated onto the two-dimensional symbology 22. The light source 34 may be triggered by the signal generated by the position sensor 36.

Disposed within the base portion 16 is a control logic unit 38 used to operate the imager 10. The control logic unit 38 receives the signal from the position sensor 36, and controls operational timing of the light source 34 and sensor 32. The control logic unit 38 may additionally have the capability to decode the pixel data received from the sensor 32, or may transmit the raw data to an external device for decoding through a data port 42, such as a conventional RS-232 port.

Electrical power is provided to the control logic unit 38 from an external AC or DC power source through a power port 44. The control logic unit 38 may further include a power supply or voltage converter to rectify incoming electrical power to desired voltage levels.

Upon insertion of the card 24 to the maximum axial extent of the slot 14, the entire upper surface of the card is illuminated by the light source 34, including the symbology 22. Light reflected from the card 24 and the symbology 22 is transmitted through the lens 40 onto the sensor 32. The sensor 32 converts the transmitted light energy into pixel data that is subsequently deciphered either within the imager 10 or by an external device. The imager 10 is capable of recognizing the symbology 22 from the pixel data, and eliminates all extraneous information to leave only the information of the symbology.

Since there is a reliable power source for the imager 10, the performance of the imager is superior over conventional portable imagers in numerous respects. First of all, the light source 34 can be brighter than that typical of portable imagers, enabling the sensor 32 to capture more detail of the two-dimensional symbology. Second, the pixel data can be processed to a greater level of detail than previously realized. In conventional portable imagers, each individual pixel is represented by a gray-scale value with a limited number of gray-scale increments utilized for simplicity, such as sixteen (16). In the present invention, a much higher number of gray-scale increments can be utilized, such as two hundred fifty six (256). As a result, the imager 10 can identify very subtle details of the two-dimensional symbology that may ordinarily be overlooked. Third, a greater transmitting range of for the processed pixel data can be achieved in embodiments in which the data is transmitted from the imager 10 to another device, such as over an RF data link. Furthermore, the conventional fixed mount laser imagers require complex moving parts to articulate the beam, and also require a longer period of time in which to obtain a complete scan of a particular symbology.

Figure 3:
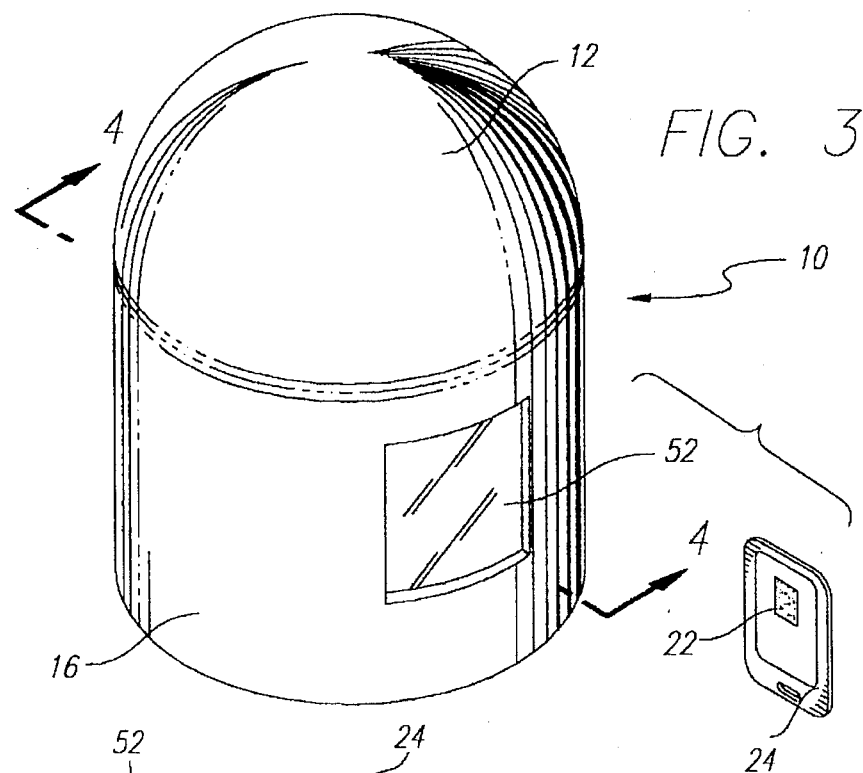
FIG. 3 is a perspective view of a first alternative embodiment of a one or two-dimensional symbology imager.
Figure 4:
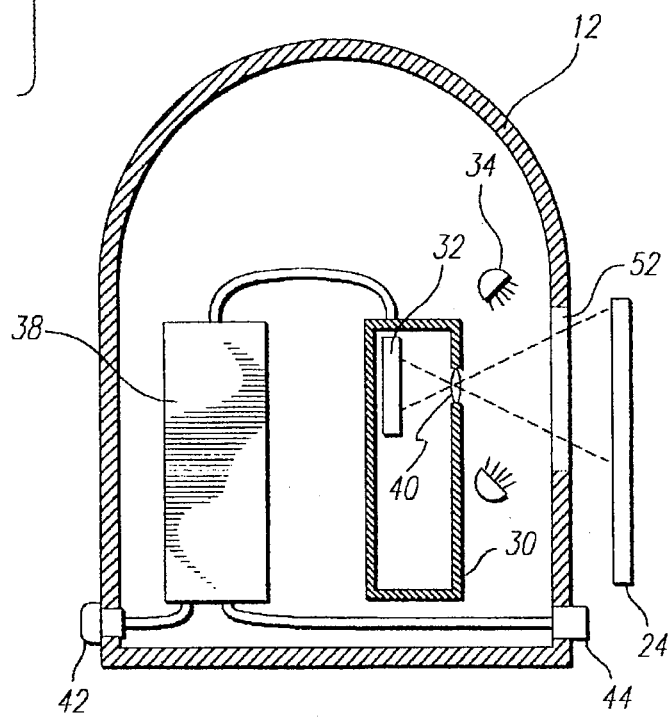
FIG. 4 is a sectional side view of the first alternative embodiment of the one or two-dimensional symbology imager, as taken through section 4—4 of FIG. 3.

Referring now to FIGS. 3 and 4, an alternative embodiment of the imager 10 is illustrated. In this alternative embodiment, a window 52 is utilized instead of the slot 14 and channel 50 of the previous embodiment. The window 52 is disposed on a side surface of the base portion 12 of the imager 10 so that it faces in a horizontal direction. The precise size, shape and material of the window 52 is not critical, but should be approximately the same size or larger than a media containing a one or two-dimensional symbology desired to be imaged. Alternatively, the window 52 may simply be an opening through the housing 16. In FIG. 3, a card 24 containing a symbology 22 is brought into proximity with the window 52, though it should be apparent that any type of media containing a one or two-dimensional symbology can be read in a similar manner.

FIG. 4 illustrates that the internal aspects of the alternative imager 10 are substantially the same as the embodiment described above, except that there is no longer a need for a channel to receive a card. In this embodiment, the optical module 30 has a vertical orientation with the lens 40 substantially facing the window 52. Similarly, the light source 34 also faces the window 52 so that illumination from within the imager 10 will be transmitted through the window onto a media in proximity to the window. The light source 34 may be triggered by a manual switch, such as a foot pedal or key switch, or alternatively, may utilize a proximity sensor that detects the presence of a media near the window. In operation, a user simply holds the media near the window 52 and it is imaged in the same manner as described previously.

Figure 5:
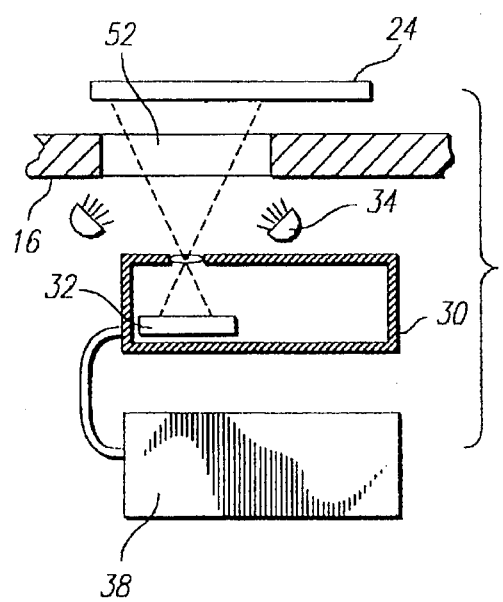
FIG. 5 is a perspective view of a second alternative embodiment of a one or two-dimensional symbology imager.

FIG. 5 illustrates another alternative embodiment of the imager 10. In this embodiment, the window 52 is disposed so that it faces in a vertically upward or downward direction, permitting the window to comprise a portion of a counter 60, such as a retail check-out counter. An operator can hold a media containing a one or two-dimensional symbology 22 over the window, and the imager 10 will read the information of the symbology. It should be apparent that the window 52 and optical module 30 may also be oriented at any angle between absolute horizontal and vertical in order to facilitate ease of reading of the symbology.

Figure 6:
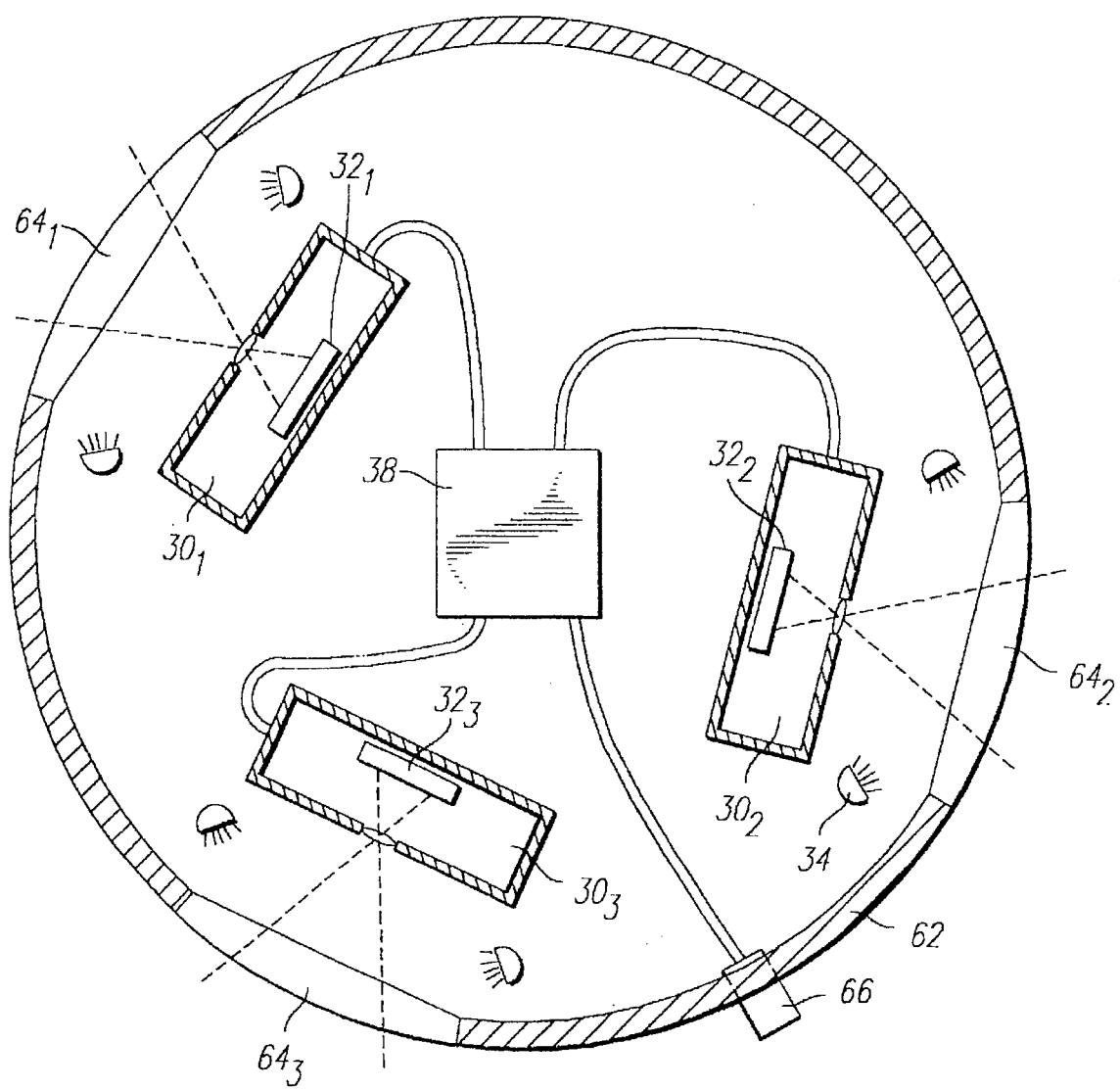
FIG. 6 is a sectional top view of a third alternative embodiment of a one or two-dimensional symbology imager.

Finally, FIG. 6 illustrates yet another alternative embodiment of the imager 10, utilizing a plurality of windows and optical modules. In this embodiment, three optical module $30_1$, $30_2$, and $30_3$ have a vertical orientation with respective lenses $40_1$, $40_2$ and $40_3$ substantially facing respective windows $64_1$, $64_2$ and $64_3$. Similarly, light sources 34 also faces each one of the window $64_1$, $64_2$ and $64_3$ so that illumination from within the imager 10 will be transmitted through the windows onto a media in proximity to any one of the windows. As above, the light source 34 may be triggered by a manual switch, such as a foot pedal or key switch, or alternatively, may utilize a proximity sensor that detects the presence of a media near the window. A control logic unit 38 decodes the pixel data received from the respective sensors $32_1$, $32_2$ and/or $32_3$, or may transmit the raw data to an external device for decoding through a data port 66. In operation, a user simply holds the media near any one of the windows $64_1$, $64_2$ and $64_3$, and it is imaged in the same manner as described previously. It should be apparent that the same symbology may be imaged simultaneously through a plurality of the windows $64_1$, $64_2$ and $64_3$ to obtain differing perspectives of the symbology.

Having thus described a preferred embodiment of a fixed mount imager using an optical module, it should be apparent to those skilled in the art that certain advantages of the within system have been achieved. The invention is further defined by the following claims.

What is claimed is:

1. A device for reading information from a card containing randomly located and oriented encoded data in the form of a one or two-dimensional symbology, comprising:

a housing having a slot adapted to receive said card therein to an axial extent thereof;

illuminating means disposed within said housing for illuminating a major portion of a surface of said card which includes and randomly located and oriented symbology as a minor portion thereof; and optical means for receiving light reflected from said surface of said card and converting said light into pixel data that includes data representative of said randomly located and oriented symbology, said optical means including means for discriminating said symbology data from among said pixel data.

2. The device of claim 1, wherein said optical means further comprises means for converting said discriminated symbology data into information signals.

3. The device of claim 1, further comprising a position sensor disposed within said slot at said axial extent, said position sensor detecting presence of said card at said axial extent and producing an associated signal.

4. The device of claim 3, wherein said illuminating means is triggered by said signal from said position sensor.

5. The device of claim 1, wherein said illuminating means further comprises at least one light emitting diode.

6. The device of claim 1, wherein said optical means further comprises a charge coupled device.

7. The device of claim 1, wherein said optical means further comprises a lens.

8. The device of claim 1, wherein said optical means further comprises an optical module having a charge coupled device adapted to receive light reflected from said card.

9. A device for reading a one or two-dimensional symbology randomly disposed on a media, comprising:

a fixed housing having at least one window therethrough;

a light source disposed within said housing adapted to provide illumination through said window onto a major portion of a surface of said media when positioned in proximity to said window such that said major portion of said surface includes said randomly disposed symbology as a minor portion thereof; and at least one optical means within said housing for receiving light reflected from said surface of said media respectively through said at least one window and converting said light into pixel data that includes data representative of said randomly disposed symbology.

10. A device for reading a one or two-dimensional symbology disposed on a media, comprising:

a fixed housing having at least one window therethrough;

a light source disposed within said housing adapted to provide illumination through said window onto said media when positioned in proximity to said window; and at least one optical means within said housing for receiving light reflected from said media respectively through said at least one window and converting said light into pixel data that includes data representative of said symbology, wherein said at least one optical means further comprises means for discriminating said symbology data from among said pixel data.

11. The device of claim 10, further comprising means for alerting a user of said device upon successful completion of discrimination of said symbology data.

12. A device for reading a one or two-dimensional symbology disposed on a media, comprising:

a fixed housing having at least one window therethrough;

a light source disposed within said housing adapted to provide illumination through said window onto said media when positioned in proximity to said window;

at least one optical means within said housing for receiving light reflected from said media respectively through said at least one window and converting said light into pixel data that includes data representative of said symbology; and means for triggering said light source upon said media being brought into proximity with said at least one window.

13. The device of claim 9, wherein said at least one optical means further comprises a charge coupled device.

14. The device of claim 9, wherein said light source further comprises at least one light emitting diode.

15. The device of claim 9, wherein said at least one optical means further comprises an optical module having a charge coupled device adapted to receive light reflected from said media.

16. The device of claim 9, wherein said at least one window is disposed on a horizontally facing surface of said housing.

17. The device of claim 9, wherein said at least one window is disposed on a vertically facing surface of said housing.

18. A method for reading a one or two-dimensional symbology randomly disposed on a medium, comprising:

illuminating a major portion of a surface of said medium from a light source disposed within a housing through at least one opening in said housing, said major portion of said surface including said randomly disposed symbology as a minor portion thereof;

receiving light reflected from said surface of said medium through said opening and converting said light into pixel data that includes data representative of said symbology; and discriminating said randomly disposed symbology data from among said pixel data.

19. The method of claim 18, further comprising the step of detecting presence of said medium and producing an associated signal.

20. The method of claim 18, further comprising the step of alerting a user upon completion of said converting step.

21. A device for reading a one or two-dimensional symbology randomly disposed on a media, comprising:

a fixed housing having at least one window therethrough;

a light source disposed within said housing adapted to provide light through said window onto a major portion of a surface of said media when positioned in proximity to said window, said major portion including said randomly disposed symbology as a minor portion thereof; and at least one optical sensor disposed within said housing and being adapted to receive light reflected from said surface of said media respectively through said at least one window and convert said light into pixel data that includes data representative of said symbology.

22. The device of claim 21, wherein said at least one optical sensor further comprises means for discriminating said data representative of said symbology from among said pixel data.

23. A device for reading information from a card containing randomly located and oriented encoded data in the form of a one or two-dimensional symbology, comprising:

a housing having a slot adapted to receive said card therein to an axial extent thereof;

a light source disposed within said housing and adapted to illuminate a major portion of a surface of said card including said randomly located and oriented symbology as a minor portion thereof; and an optical sensor disposed within said housing and adapted to receive light reflected from said surface of said card, convert said light into pixel data that includes data representative of said randomly located and oriented symbology, and discriminate said symbology data from among said pixel data.

* * * * *